(12) United States Patent
Dielacher et al.

(10) Patent No.: US 10,091,492 B2
(45) Date of Patent: Oct. 2, 2018

(54) IMAGING APPARATUSES AND A TIME OF FLIGHT IMAGING METHOD

(71) Applicant: Infineon Technologies AG, Neubiberg (DE)

(72) Inventors: Markus Dielacher, Graz (AT); Martin Flatscher, Graz (AT); Michael Mark, Graz (AT); Josef Prainsack, Graz (AT)

(73) Assignee: Infineon Technologies AG, Neubiberg (DE)

(*) Notice: Subject to any disclaimer, the term of this patent is extended or adjusted under 35 U.S.C. 154(b) by 400 days.

(21) Appl. No.: 14/887,400

(22) Filed: Oct. 20, 2015

(65) Prior Publication Data

US 2016/0112696 A1    Apr. 21, 2016

(30) Foreign Application Priority Data

Oct. 21, 2014    (DE) .................. 10 2014 115 310

(51) Int. Cl.

| | |
|---|---|
| *H04N 13/254* | (2018.01) |
| *H04N 13/02* | (2006.01) |
| *G01S 17/89* | (2006.01) |
| *G01S 17/08* | (2006.01) |
| *G01S 7/481* | (2006.01) |

(Continued)

(52) U.S. Cl.
CPC ......... *H04N 13/254* (2018.05); *G01S 7/4815* (2013.01); *G01S 7/4863* (2013.01); *G01S 7/4865* (2013.01); *G01S 7/499* (2013.01); *G01S 17/08* (2013.01); *G01S 17/89* (2013.01); *H04N 13/0253* (2013.01)

(58) Field of Classification Search
CPC ....... G01B 11/002; G01S 17/42; G01S 17/66; G01S 17/936
See application file for complete search history.

(56) References Cited

U.S. PATENT DOCUMENTS

| | | | |
|---|---|---|---|
| 6,122,042 A | 9/2000 | Wunderman et al. | |
| 2010/0258708 A1* | 10/2010 | Meyers .................. | G01S 17/36 250/208.1 |

(Continued)

FOREIGN PATENT DOCUMENTS

| | | |
|---|---|---|
| CN | 103439295 | 12/2013 |
| DE | 4011041 A1 | 10/1991 |
| DE | 10342800 A1 | 4/2005 |

(Continued)

*Primary Examiner* — Luke D Ratcliffe
(74) *Attorney, Agent, or Firm* — Harrity & Harrity, LLP

(57) ABSTRACT

The imaging apparatus includes an image sensor circuit comprising a time of flight sensor pixel. The imaging apparatus further includes a first light emitter having a first spatial offset relative to the time of flight sensor pixel. The imaging apparatus further includes a second light emitter having a second spatial offset relative to the time of flight sensor pixel. The imaging apparatus further includes an image processing circuit configured to produce an image of a region of an object based on first sensor pixel image data and second sensor pixel image data generated by the time of flight sensor pixel. The first sensor pixel image data is based on received light emitted by the first light emitter and reflected at the object's region and wherein the second sensor pixel image data is based on received light emitted by the second light emitter and reflected at the object's region.

20 Claims, 6 Drawing Sheets

(51) Int. Cl.
G01S 7/486 (2006.01)
G01S 7/499 (2006.01)

(56) References Cited

U.S. PATENT DOCUMENTS

2012/0256764 A1* 10/2012 Zeng .................. G01B 11/002
                                                  340/905
2014/0293262 A1* 10/2014 Hunt ..................... G01S 17/89
                                                  356/4.01

FOREIGN PATENT DOCUMENTS

| DE | 102004032176 A1 | 1/2006 |
| DE | 102004032489 A1 | 1/2006 |
| DE | 102006044794 A1 | 3/2008 |
| DE | 102012205448 A1 | 10/2012 |
| DE | 102013002683 A1 | 8/2014 |
| WO | WO 2010/012697 A1 | 2/2010 |

* cited by examiner

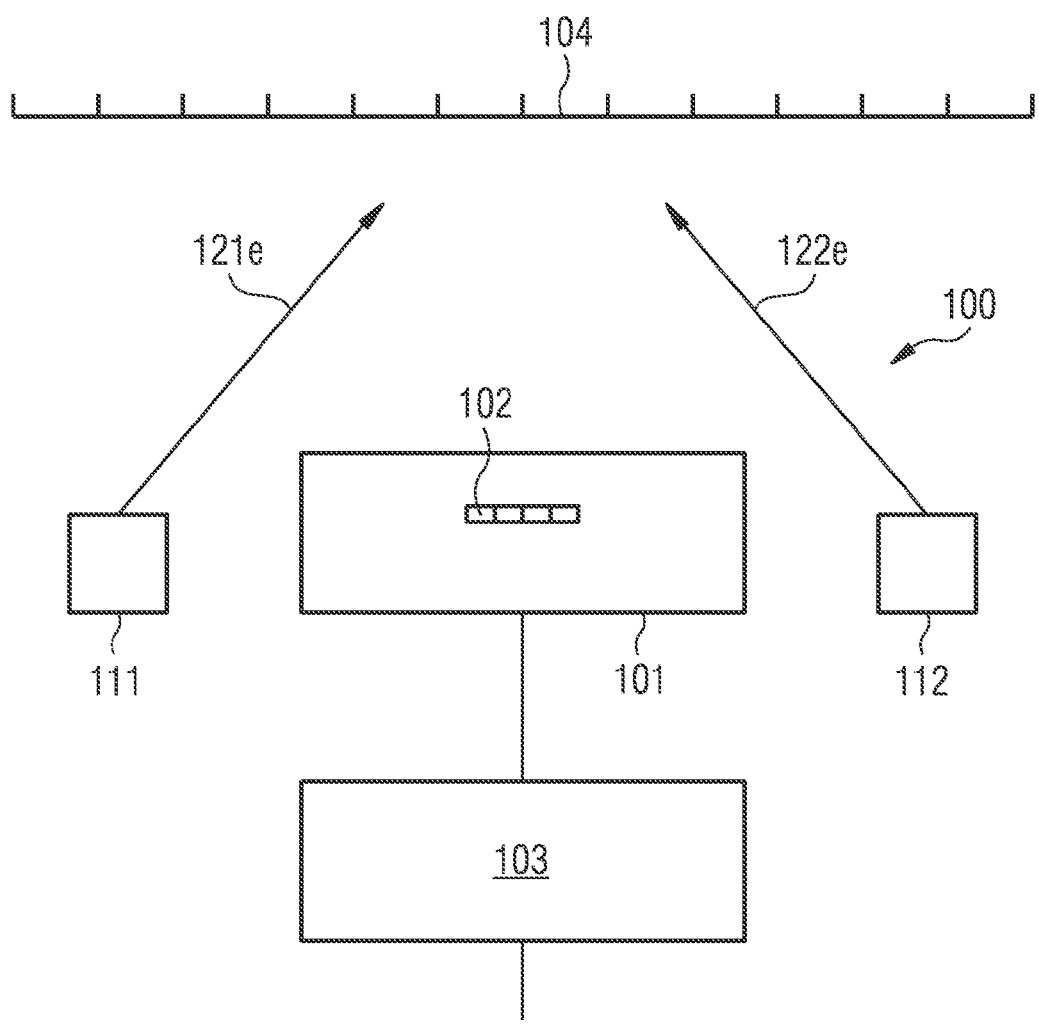

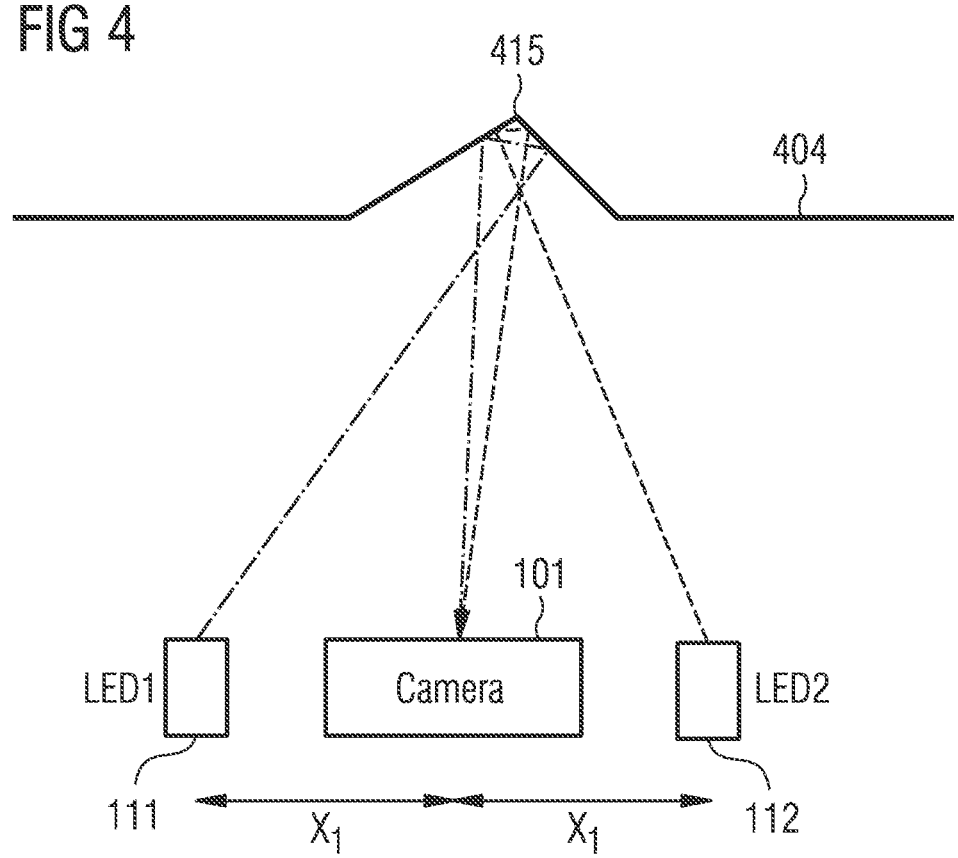

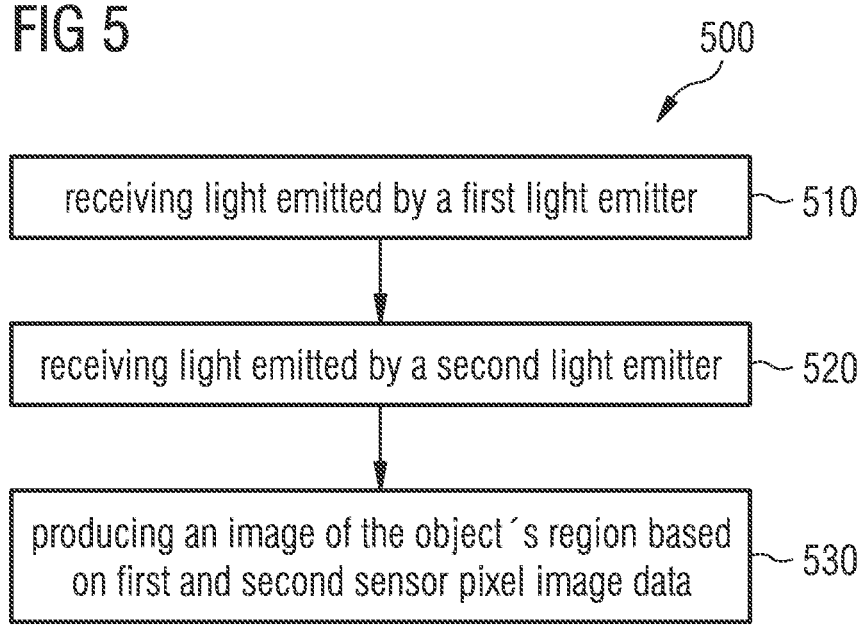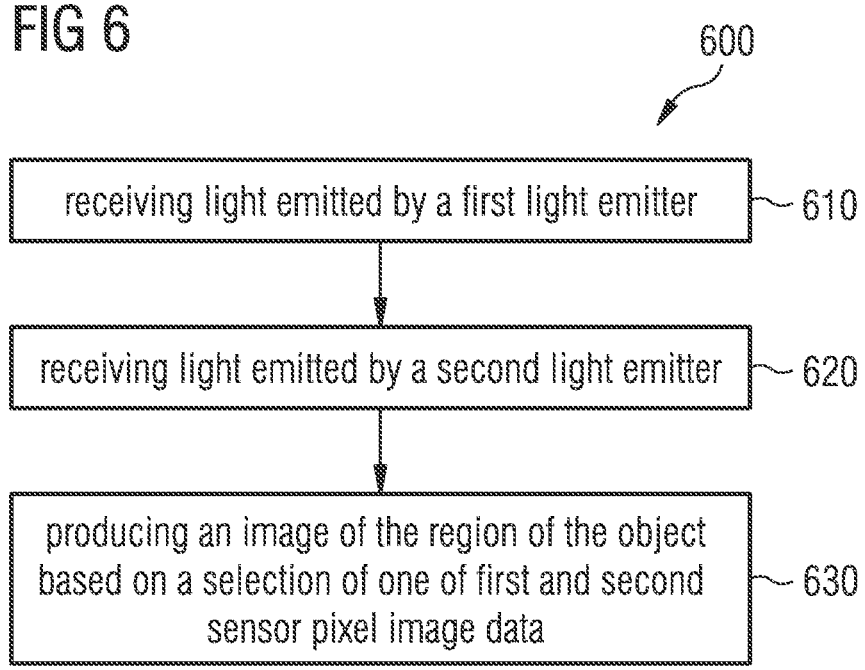

IMAGING APPARATUSES AND A TIME OF FLIGHT IMAGING METHOD

RELATED APPLICATION

This application claims priority under 35 U.S.C. § 119 to German Patent Application No. 102014115310.3, filed on Oct. 21, 2014, the content of which is incorporated by reference herein in its entirety.

TECHNICAL FIELD

Embodiments relate to producing three-dimensional images and in particular to imaging apparatuses and a time of flight imaging method.

BACKGROUND

Time of flight (TOF) systems are based on three-dimensional (3D) image sensor principles. Pixels may be more complex compared to pixels of a two-dimensional (2D) imager, for example. Pixels may be larger, for example. A high resolution imager may require large chip area, large optics and a large volume camera, for example. This may result in high or increased costs, for example.

SUMMARY

Some embodiments relate to an imaging apparatus. The imaging apparatus includes an image sensor circuit comprising a time of flight sensor pixel. The imaging apparatus further includes a first light emitter having a first spatial offset relative to the time of flight sensor pixel. The imaging apparatus further includes a second light emitter having a second spatial offset relative to the time of flight sensor pixel. The imaging apparatus further includes an image processing circuit configured to produce an image of a region of an object based on first sensor pixel image data and second sensor pixel image data generated by the time of flight sensor pixel. The first sensor pixel image data is based on received light emitted by the first light emitter and reflected at the object's region and wherein the second sensor pixel image data is based on received light emitted by the second light emitter and reflected at the object's region.

Some embodiments relate to a time of flight imaging method. The method includes receiving, by a time of flight sensor pixel, light emitted by a first light emitter having a first spatial offset relative to the time of flight sensor pixel and reflected by a region of an object to generate first sensor pixel image data. The method further includes receiving, by the time of flight sensor pixel, light emitted by a second light emitter having a second spatial offset relative to the time of flight sensor pixel and reflected by the region of the object to generate second sensor pixel image data. The method further includes producing an image of the object's region based on the first and second sensor pixel image data generated by the time of flight sensor pixel.

Some embodiments relate to an imaging apparatus. The imaging apparatus includes an image sensor circuit comprising a plurality of time of flight sensor pixels. The imaging apparatus includes a first light emitter having a first spatial offset relative to the image sensor circuit. The imaging apparatus includes a second light emitter having a second spatial offset relative to the image sensor circuit. The imaging apparatus includes an image processing circuit configured to produce an image of a region of an object based on first sensor pixel image data and second sensor pixel image data generated by a time of flight sensor pixel of the plurality of time of flight sensor pixels. The image comprises first sub-image data of a first sub-region of the object and second sub-image data about a second sub-region of the object. The first sensor pixel image data is based on received light emitted by the first light emitter and reflected by the object and wherein the second sensor pixel image data is based on received light emitted by the second light emitter and reflected by the object.

BRIEF DESCRIPTION OF THE FIGURES

Some embodiments of apparatuses and/or methods will be described in the following by way of example only, and with reference to the accompanying figures, in which FIG. 1 shows a schematic illustration of an imaging apparatus;

FIG. 4 shows a schematic illustration of an imaging apparatus;

FIG. 5 shows a flowchart of a time of flight imaging method;

FIG. 6 shows a flowchart of a time of flight imaging method.

DETAILED DESCRIPTION

Figure 2A:
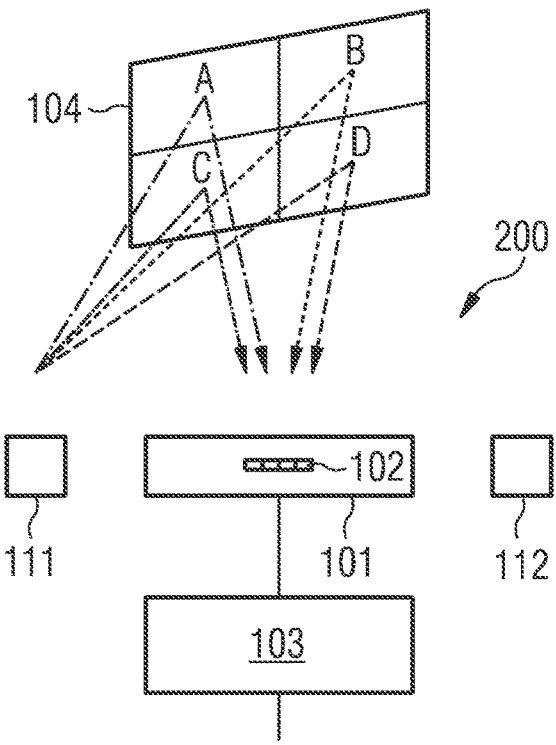
FIGS. 2A to 2D show schematic illustrations of an imaging apparatus.

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 shows a schematic illustration of an imaging apparatus 100 according to an embodiment. The imaging apparatus 100 includes an image sensor circuit 101 including a time of flight sensor pixel 102. The imaging apparatus 100 further includes a first light emitter 111 having a first spatial offset relative to the time of flight sensor pixel 102. The imaging apparatus 100 further includes a second light emitter 112 having a second spatial offset relative to the time of flight sensor pixel 102. The imaging apparatus 100 further includes an image processing circuit 103 configured to produce an image of a region of an object 104 based on first sensor pixel image data and second sensor pixel image data generated by the time of flight sensor pixel 102. The first sensor pixel image data is based on received light emitted by the first light emitter 111 and reflected at the object's region and wherein the second sensor pixel image data is based on received light emitted by the second light emitter 112 and reflected at the object's region.

Due to the implementation of an imaging apparatus having a first light emitter having a first spatial offset and a second light emitter having a second spatial offset, an image of a region of an object may be produced based on first sensor pixel image data and the second sensor pixel image data. This may lead to an image of a region of the object with an improved resolution or more detailed information, for example. Furthermore, for example, multipath propagation of light transmitted from the first or second light emitter may be eliminated or reduced based on a comparison of the first and second sensor pixel image data from light emitters having different spatial offsets.

The imaging apparatus 100 may be used to determine distance information related to an object 104 or to produce a three-dimensional image of the object 104, for example. For example, the imaging apparatus 100 may be a camera, such as a time of flight (TOF) camera. The object may be a person, or thing, or scenery to be photographed, for example. For example, the object may be a three-dimensional (3D) scene or object, e.g. having a height, width and depth.

The distance information related to the object may be the distance between the object or the distances between different regions of the object and at least part of the imaging apparatus, for example. For example, the distance information to be determined by the apparatus 100 may be a distance between one or more different locations or one or more regions or points of the surface profile of the object and at least part of the imaging apparatus 100, for example. By determining the distance information related to the object, three-dimensional information (e.g. the height, width and depth) about the object or regions of the object may be determined by the imaging apparatus.

The first 111 and second 112 light emitter may each respectively include one or more light sources, e.g. one or more light emitting diodes (LED) or lasers, for example. The first 111 and second 112 light emitter may each be configured to carry out active illumination of the object with a modulated optical signal, e.g. modulated infra-red light or visible light, modulated with an electrical modulation control signal, for example. The first 111 and the second 112 light emitter may each be configured to emit the modulated optical signal at a modulations frequency (e.g. between 1 MHz to 200 MHz) corresponding to the frequency of the modulation control signal, for example.

The first light emitter 111 may have a first spatial offset with respect to the TOF sensor pixel, and the second light emitter 112 may have a second spatial offset with respect to the TOF sensor pixel. The first spatial offset and the second spatial offset may be different from each other, for example. For example, the first light emitter 111 and the second light emitter 112 may be arranged in different positions with respect to the imaging apparatus 100, or with respect to the image sensor circuit 101. In some examples, the first light emitter 111 and the second light emitter 112 may be arranged at different equidistant positions relative to the image sensor circuit 101 (or the TOF sensor pixel). In other examples, the first light emitter 111 and the second light emitter 112 may be arranged at different non-equidistant positions relative to the time of flight sensor pixel (or the image sensor circuit 101). In some examples, the first light emitter and the second light emitter may be arranged symmetrically with respect to at least one axis of symmetry of the image sensor circuit 101 (or at least one axis of symmetry of the TOF sensor pixel).

The first light emitter 111 may be configured to emit light during a first time interval and the second light emitter 112 may be configured to emit light during a second time interval. The first and second time interval may be different, for example. In some examples, the first 111 and second 112 light emitter may be configured to emit light sequentially or consecutively. For example, they may be configured to emit light one after the other. In other examples, the first light emitter 111 and the second light emitter 112 may be configured to emit differently polarized light simultaneously or sequentially.

The image sensor circuit 101 may include a TOF sensor pixel array such as a two-dimensional array of a plurality of TOF sensor pixels. Each TOF sensor pixel 102 may include a photodetection circuit for the detection of light. For example, the photodetection circuit may include a generation zone, e.g. a photosensitive region, such as a depletion region or space charge region, where photogenerated charge carriers (e.g. positive charge-carriers, e.g. holes, or negative charge-carriers, e.g. electrons) may be generated, for example. The photodetection circuit may be implemented by a photodiode, for example. The number of photogenerated charge carriers generated in each individual TOF sensor pixel 102 may be proportional to the intensity of light emitted from the first and/or second light emitter, subsequently reflected by the object and received by that TOF sensor pixel 102. Each TOF sensor pixel 102 of the image sensor circuit 102 may produce sensor pixel image data, which may be based on an electrical signal, e.g. a voltage signal or current signal proportional to the number of photogenerated charge carriers generated by the pixel element.

Each TOF sensor pixel may include a photonic mixing device (PMD) configured to generate the first and the second sensor pixel image data based on a respective cross-correlation measurement based on received modulated light and a reference modulation signal, for example. For example, the TOF sensor pixel may be implemented as a PMD device including transparent charge collectors or photogates working in alternating bias. By synchronizing the light emitters with a modulation control signal, the light emitters may be configured to generate a plurality of light pulses, e.g. infrared or visible light, at a modulation frequency of the modulation control signal. The reflected light pulses having the modulations frequency may be received by the image sensor circuit (e.g. the TOF sensor pixels) which may each measure the phase delay (or phase shift) of the reflected received light with respect to modulation control signal. The frequency of alternating bias (push-pull signal pulses) applied to the photogates may be based on the modulation frequency of the modulation control signal which may also be used for modulation of the light emitters. The alternatingly biased photogates may alternatingly receive the light pulses reflected by the object. As the received light is also modulated with the same signal as the PMD image sensor circuit, the difference in the electrical signal output from the first photogate and the second photogate may be directly dependent on the phase delay between the received light and the modulation control signal and may be represented by a correlation function, for example.

The TOF imager (or each TOF sensor pixel) may provide a complex measurement according to the following equation:

$$\underline{Z_{meas}} = |Z_{meas}| \cdot e^{j\varphi_{meas}} \cdot Z_{meas}$$

may represent the sensor pixel image data measured by the TOF sensor pixel by the correlation measurement, for example.

$|Z_{meas}|$ may represent amplitude information based on received light by one TOF sensor pixel. The amplitude information may be based on the reflectivity of the object (or the reflectivity of a region of the object from which light is reflected and received by the TOF sensor pixel), for example. $e^{j\varphi_{meas}}$ may represent measured phase information (indicated by $\varphi_{meas}$ based on received light by the TOF sensor pixel which may include the distance information of the object.

Each TOF sensor pixel may be configured to generate sensor pixel image data based on the cross-correlation measurement, which may be used to calculate the distance of a region of the object to the image sensor circuit 102. The distance calculated may be proportional to the phase shift divided by the modulation frequency, for example. The distance measurement may be carried out in the time-domain by measuring the phase shift between the modulation control signal and the reflected light, for example. The first sensor pixel image data may be generated based on light emitted by the first light emitter 111 and received by one TOF sensor pixel, and the second sensor pixel image data may be generated based on light emitted by the second light emitter 112 and received by the TOF sensor pixel, for example. The image processing circuit 103 of the imaging apparatus 100 may be configured to produce an annotated depth map including an amplitude image as a depth map quality indicator, for example.

In some examples, the image processing circuit 103 may be configured to produce a 3D image of the object 104 having an increased image resolution compared to a resolution of the TOF sensor array. Furthermore, additional information from different view angles may be used for different purposes, e.g. to obtain more details from the object. The image processing circuit 103 may be configured to produce a three-dimensional (3D) image of the object 104 based on the first sensor pixel image data and the second sensor pixel image data generated by each TOF sensor pixel 102 of the plurality of TOF sensor pixels. The first sensor pixel image data may be image data generated by the TOF sensor pixel based on light emitted by the first light emitter and the second sensor pixel image data may be image data generated by the TOF sensor pixel based on light emitted by the second light emitter, for example.

The image processing circuit 103 may be configured to produce a 3D image of the object 104 by producing a plurality of sub-image data or sub-pixel images based on the plurality of sensor pixel image data generated by one TOF sensor pixel, for example. Therefore, the 3D image of the object 104 generated by the image processing circuit 103 may be based on the generation of a plurality of sub-image data (or sub-pixel data) wherein the number of sub-image data generated is greater than the number of TOF pixels of the image sensor circuit, for example.

For example, based on first and second sensor pixel image data of a region of the object generated by one TOF sensor pixel, the image processing circuit 103 may be configured to determine first sub-image data of a first sub-region of a region of the object (e.g. the object's region) and second sub-image data of a second sub-region of the region of the object (e.g. the object's region). The first sub-region and the second sub-region may be different sub-regions of the region of the object. The number of sub-regions, s, corresponds to a number of light emitters, r, having the different spatial offsets, for example. For example, the image processing circuit 103 may determine, based on a number of sensor pixel image data of a region of the object generated by one TOF sensor pixel, a number of sensor pixel sub-image data each corresponding to a respective different sub-region of the region of the object and corresponding to the number of light emitters, r, having different spatial offsets whose emitted light was used to generate the number of sensor pixel image data of the region of the object.

The number of sensor pixel sub-image data d, may correspond to (or be equal to) the number of light emitters used to emit light and may contain or include information related to the region of the object. The number of sensor pixel sub-image data, d, may also correspond to (or be equal to) the number of number of sub-regions, s, of the object for which sensor pixel sub-image data is generated. For example, the image processing circuit 103 may be configured to determine the first and the second sub-image data based on the first and the second sensor pixel image data. By subsequently or sequentially activating different illumination units (or e.g. light emitters at different positions), the resolution of a TOF system may be increased, e.g. the resolution of a 3D image produced by the imaging apparatus 100 or a TOF system may be increased.

In some examples, the image processing circuit 103 may additionally or alternatively be configured to produce a reduced-error image of the object based on a comparison of phase information of the first sensor pixel image data and the second sensor pixel image data. For example, the image processing circuit may be configured to produce the image of the object's region based on a selection of one of the first sensor pixel image data and the second sensor pixel image data having a minimum phase value. In this way, sensor pixel image data generated by light emitters having different spatial offsets may be used to reduce multipath propagation based on the different positions of the light emitters. Images which suffer from high multipath propagation may be eliminated, or reduced, and a produced 3D image may be based on image data with minimal or reduced multipath propagation, for example.

FIGS. 2A to 2D show a schematic illustration of an imaging apparatus 200 according to an embodiment.

The imaging apparatus 200 includes an image sensor circuit including a plurality of time of flight sensor pixels. The imaging apparatus 200 further includes a first light emitter 111 having a first spatial offset relative to the image sensor circuit 101. The imaging apparatus 200 further includes a second light emitter 112 having a second spatial offset relative to the image sensor circuit 101. The imaging apparatus 200 further includes an image processing circuit 103 configured to produce an image of a region of an object based on first sensor pixel image data and second sensor pixel image data generated by a time of flight sensor pixel of the plurality of time of flight sensor pixels. The image includes first sub-image data of a first sub-region of the object and second sub-image data about a second sub-region of the object.

The first sensor pixel image data is based on received light emitted by the first light emitter and reflected by the object and wherein the second sensor pixel image data is based on received light emitted by the second light emitter and reflected by the object.

Due to the implementation of the imaging apparatus having a first light emitter having a first spatial offset and a second light emitter having a second spatial offset, an image of a region of an object may be produced based on first sensor pixel image data and the second sensor pixel image data. The image of the region of the object may have an improved resolution or more detailed information, for example.

The imaging apparatus 200 may be similar to the imaging apparatus described with respect to FIG. 1, for example. The imaging apparatus 200 may be configured to produce a three-dimensional (3D) image having increased resolution or with increased detail, for example. The imaging apparatus 200 may be a TOF system, which may measure amplitude and phase (vectors), for example. Measured phase information may be indicative of distance information of the object (e.g. a distance from a light emitter to the object and from the object to a reference, such as to the imaging apparatus or to the imaging sensor circuit), for example. The measured amplitude information may be indicative of the reflectivity of the object, for example.

For generating sensor pixel sub-image data information based on sensor pixel image data information, unknown parameters may be generated. For example, for splitting up one pixel into four sub-pixels, 8 unknown parameters (e.g. four amplitudes and four phases) may be calculated, for example.

FIG. 2A shows an example of sensor pixel image data being measured by the imaging apparatus 200. Light may be emitted by one light emitter (e.g. the first light emitter) during a first time interval. The measured sensor pixel image data by one TOF sensor pixel which may be based on light emitted by the light emitter and received by the TOF sensor pixel, may be represented by the vector $Z_{meas}$, which may be a superposition of a number of sub-image data (or sub-pixels) reflected from different sub-regions (e.g. sub-regions A, B, C and D) of a region of the object. The superposition of the sub-image data is shown by the arrows emitted by the first light emitter 111 and reflected from the different sub-regions and received by the plurality of TOF sensor pixels, for example.

Figure 2B:
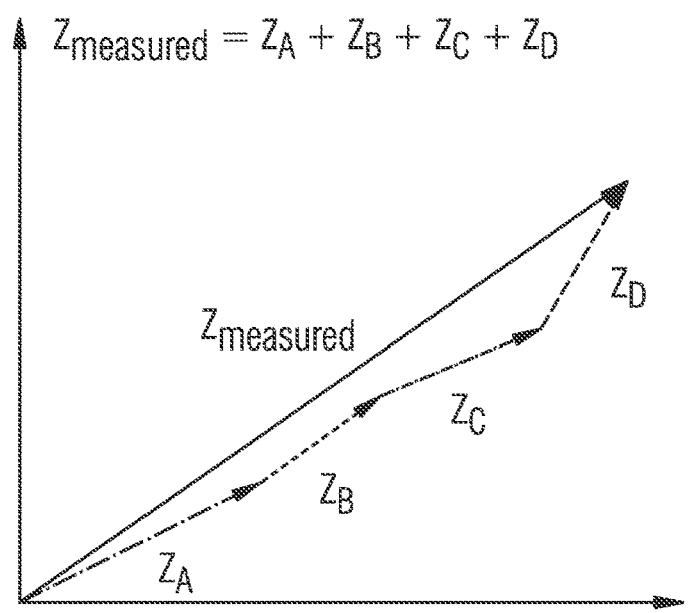

FIG. 2B shows that the measured vector $Z_{meas}$ or $Z_{measured}$ may be a superposition (or addition) of four sub-pixels (or e.g. four sub-image data). For example, $Z_{meas}=Z_A+Z_B+Z_C+Z_D$. A number of equations may be obtained from measurements by the plurality of light emitters (e.g. LEDs 1, 2, 3 and 4) having different spatial offsets. For example, a different measured vector may be obtained based on received light from different light emitters at different positions. For example, a number of equations may be obtained based on sensor pixel image data generated by different light emitters having different spatial offsets. For example, eight equations may be obtained from four different measurements with different LED positions (for different distances and/or phase).

Figure 2C:
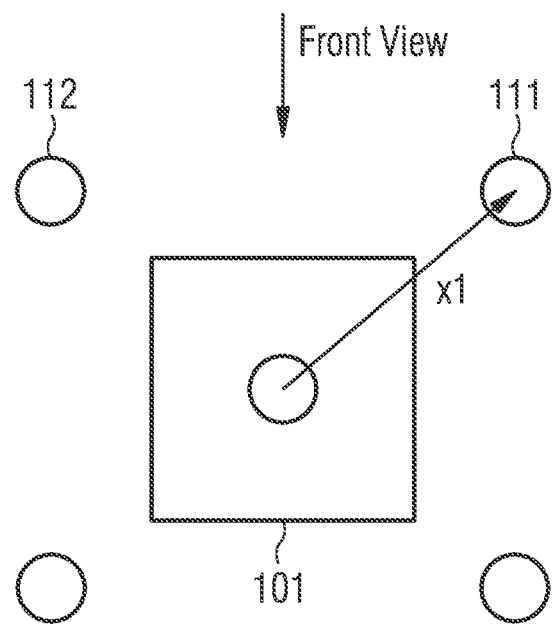

FIG. 2C shows a front view of the imaging apparatus 200 according to an embodiment. For example, the imaging apparatus 200 may include a plurality of light emitters e.g. four light emitters (e.g. a first, second, third and fourth light emitter), or e.g. four LEDs which may each be arranged at different equidistant positions relative to the image sensor circuit 101 or relative to the 2D sensor pixel array. For example, the plurality of light emitters may be arranged symmetrically with respect to an axis of symmetry (e.g. a horizontal or vertical or diagonal line of symmetry) of the image sensor circuit 101 or of the array of TOF sensor pixels. The plurality of light emitters may each be arranged coplanar to a planar surface of the 2D sensor pixel array. The planar surface of the 2D sensor pixel array may be the surface area of the sensor pixel array receiving for receiving reflected light from the light emitters, for example.

In an example, the distance, x1, between a light emitter of the plurality of light emitters and the image sensor circuit 101 may be greater than 1 cm, e.g. greater than 5 cm, or e.g. greater than 10 cm. In other examples, the distances between each of the plurality of light emitters and the image sensor circuit 101 may be different, for example. In some examples, the distance between a light emitter and a neighboring light emitter may be greater than 2 cm, e.g. greater than 5 cm, or e.g. greater than 10 cm.

A light emitter control circuit may control the emission of light from the plurality of light emitters, for example. For example, the light emitter control circuit may be configured to trigger the light emitters to emit light consecutively or sequentially at a modulations frequency of a modulation control signal. For example, the light emitter control circuit may be configured to trigger the first light emitter followed by the second light emitter, followed by the third light emitter and following by the fourth light emitter. The image sensor circuit 101 (or each TOF sensor pixel) may be configured to receive light emitted by the first light emitter and reflected by the object during a first time interval. The image sensor circuit 101 (or each TOF sensor pixel) may be configured to receive light emitted by the second light emitter and reflected by the object during a second time interval. The image sensor circuit 101 (or each TOF sensor pixel) may be configured to receive light emitted by the third light emitter and reflected by the object during a third time interval. The image sensor circuit 101 (or each TOF sensor pixel) may be configured to receive light emitted by the fourth light emitter and reflected by the object during a fourth time interval, for example. The first to fourth time interval may be consecutive time intervals, for example.

In other examples, the first and second light emitter may be part of a single light emitting source (e.g. a single LED or a single group of LEDs). The light emitter control circuit may be configured to selectively control the emission of light by the single light emitting source at different exit points, where the exit points may have different spatial offsets with respect to the image sensor circuit. For example, the exit points of the first light emitter and the second light emitter may be controlled by the control circuit via an optical switching board, for example. For example, the first light emitter and the second light emitter may each respectively include a light emitting portion of a light transmitter or may include light emitting optical or glass fibers controlled by optical switches.

The light emitter control circuit may further control the emission of light from the plurality of light emitters, so that in a first light emission mode, a single light emitter may be configured to emit light at the modulations frequency and the image produced by the image processing circuit may be based on light emitted by that single light emitter and received by the image sensing circuit, for example. For example, this may be when the imaging apparatus enters a low power mode and when the low power mode is detected by the light emitter control circuit, for example. The first light emission mode may be used for example, in the low power mode where the entire (increased) pixel resolution (e.g. the increased image resolution with more detailed information) is not necessarily needed, for example. In a second light emission mode, a plurality of light emitters (e.g. more than two light emitters) may be configured to sequentially emit light at the modulations frequency as described above. The low power mode may be detected by the TOF camera (e.g. the imaging apparatus) itself, for example, by gesture recognition, or e.g. by detecting that no hand is present or that the hand is at rest. In such cases, the TOF camera may self-recognize that increased resolution is not needed, and the imaging apparatus can enter the low power mode (e.g. the first light emission mode). In which case, only one LED may be activated. For example, with reduced performance, the light may be directed to only one light emission exit point.

In other examples, the light emitter control circuit may be configured to trigger the light emitters to emit differently polarized light simultaneously or sequentially.

Figure 2D:
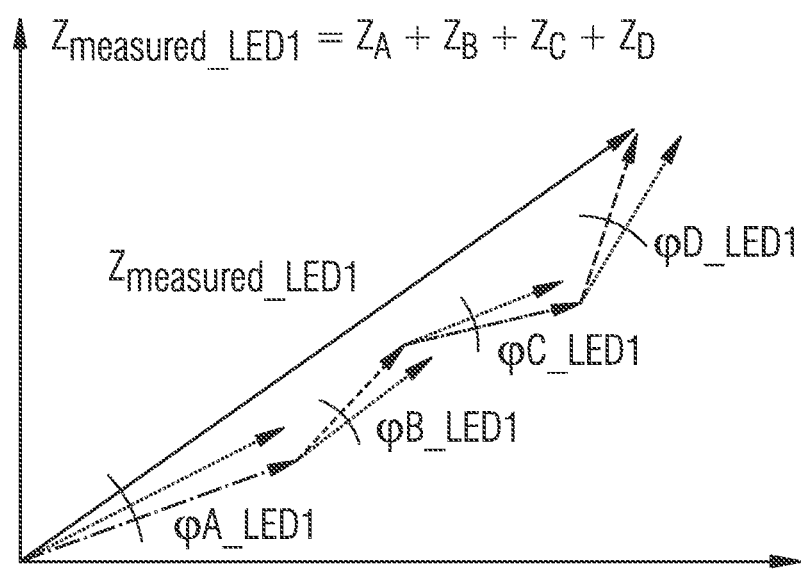

FIG. 2D shows that the measured (e.g. measured vector $Z_{meas\_LED1}$ by one TOF sensor pixel based on light emitted by the first light emitter and received by the TOF sensor pixel may be a superposition (or addition) of four sub-pixels (or e.g. four sub-image data). For example, $Z_{measured\_LED1} = Z_A + Z_B + Z_C + Z_D$. $Z_A$, $Z_B$, $Z_C$ and $Z_D$ may each include respective phase information $\varphi_{A\_LED1}$, $\varphi_{B\_LED1}$, $\varphi_{C\_LED1}$ and $\varphi_{D\_LED1}$ for each of the respective sub-image data corresponding to sub-regions A, B, C and D, for example. The phase information $\varphi_{A\_LED1}$, $\varphi_{B\_LED1}$, $\varphi_{C\_LED1}$ and $\varphi_{D\_LED1}$ may each represent a phase offset with respect to a reference phase value, for example.

Based on the measured sensor pixel image data, four sub-image data may be obtained. For the sake of simplicity, an example is shown herein which describes how two sub-image data may be determined based on the measured sensor pixel image data using two different light emitters at different positions, for example.

The TOF imager (or each TOF sensor pixel) may provide a complex measurement (of the measured sensor pixel image data), according to the following equation:

$$Z_{meas} = |Z_{meas}| \cdot e^{j\varphi_{meas}}.$$

To determine two sub-image data, the measurement may be the superposition of sub-pixels (or sub-image data) e.g. a superposition of the first sub-image data and second sub-image data.

$$Z_{meas} = |Z_a| \cdot e^{j\varphi_a} + |Z_b| \cdot e^{j\varphi_b}$$

For example, two measurements with two subsequently (or sequentially) activated light emitters (e.g. LEDs) may be represented by the equations:

$$Z_{meas1} = |Z_a| \cdot e^{j\varphi_a} \cdot e^{j\Delta\varphi_{a1}} + |Z_b| \cdot e^{j\varphi_b} \cdot e^{j\Delta\varphi_{b1}}$$

$$Z_{meas2} = |Z_a| \cdot e^{j\varphi_a} \cdot e^{j\Delta\varphi_{a2}} + |Z_b| \cdot e^{j\varphi_b} \cdot e^{j\Delta\varphi_{b2}}$$

Simplified, this means:

$$Z_{meas1} = Z_a \cdot e^{j\Delta\varphi_{a1}} + Z_b \cdot e^{j\Delta\varphi_{b1}}$$

$$Z_{meas2} = Z_a \cdot e^{j\Delta\varphi_{a2}} + Z_b \cdot e^{j\Delta\varphi_{b2}}$$

Vectors may be introduced. For example, $Z_m$ may represent measured sensor pixel image data, e.g. first and second measured sensor pixel image data represented by $Z_{meas1}$ and $Z_{meas2}$ respectively.

$$Z_m = \begin{bmatrix} Z_{meas1} \\ Z_{meas2} \end{bmatrix}$$

$Z_{meas1}$ and $Z_{meas2}$ may include intensity and phase information related to the first and second sensor pixel image data respectively.

The sub-image data to be determined may be represented by the vector $Z_{wanted}$, which may represent first and second sub-image (or sub-pixel) data, for example.

$$Z_{wanted} = \begin{bmatrix} Z_a \\ Z_b \end{bmatrix}$$

A set of time of flight offset values (e.g. a delay matrix) may be determined by the image processing circuit 103, for example. The set of time of flight offsets $\varphi_{delay}$ may include a plurality of time of flight values, e.g. $2^r$ time of flight offsets, where r represents the number of light emitters having different spatial offsets, or the number of measurements carried out based on the different light emitters. In this example, as two light emitters are used for emitting light, r=2 and $\varphi_{delay}$ may include four ($2^2=4$) time of flight values, for example.

$$\varphi_{delay} = \begin{bmatrix} e^{j\Delta\varphi_{a1}} & e^{j\Delta\varphi_{b1}} \\ e^{j\Delta\varphi_{a2}} & e^{j\Delta\varphi_{b2}} \end{bmatrix},$$

$e^{j\Delta\varphi_{a1}}$, $e^{j\Delta\varphi_{b1}}$, $e^{j\Delta\varphi_{a2}}$, and $e^{j\Delta\varphi_{b2}}$ are indicative of the first, second, third, and fourth time of flight offset values, respectively.

As $Z_m$ may be represented by the equation $Z_m = \varphi_{delay} \cdot Z_{wanted}$, $Z_{wanted}$ may be determined based on the equation $Z_{wanted} = \varphi_{delay}^{-1} \cdot Z_m$.

For example, the image processing circuit may be configured to determine the first and the second sub-image data based on the equation:

$$\begin{bmatrix} Z_a \\ Z_b \end{bmatrix} = \varphi_{delay}^{-1} \cdot \begin{bmatrix} Z_{meas1} \\ Z_{meas2} \end{bmatrix}$$

$$= \begin{bmatrix} e^{j\Delta\varphi_{a1}} & e^{j\Delta\varphi_{b1}} \\ e^{j\Delta\varphi_{a2}} & e^{j\Delta\varphi_{b2}} \end{bmatrix}^{-1} \cdot \begin{bmatrix} Z_{meas1} \\ Z_{meas2} \end{bmatrix}$$

$$= \frac{1}{\det\left(\begin{bmatrix} e^{j\Delta\varphi_{a1}} & e^{j\Delta\varphi_{b1}} \\ e^{j\Delta\varphi_{a2}} & e^{j\Delta\varphi_{b2}} \end{bmatrix}\right)} \begin{bmatrix} e^{j\Delta\varphi_{b2}} & -e^{j\Delta\varphi_{b1}} \\ -e^{j\Delta\varphi_{a2}} & e^{j\Delta\varphi_{a1}} \end{bmatrix} \cdot \begin{bmatrix} Z_{meas1} \\ Z_{meas2} \end{bmatrix}$$

$Z_a$ and $Z_b$ may each include intensity and phase information related to the first and second sub-image data respectively, for example. The image processing circuit 103 may be configured to obtain phase-shifted versions of the first and the second sensor pixel image data based on a combination of the first and the second sensor pixel image data with the set of time of flight offsets $\varphi_{delay}$.

The image processing circuit 103 may be configured to produce the first sub-image data (e.g. $\underline{Z_a}$) and the second sub-image data (e.g. $\underline{Z_b}$) based on a linear combination of phase-shifted versions of the first and the second sensor pixel image data. For example, the image processing circuit 103 may be configured to determine the first sub-image data $\underline{Z_a}$ based on a first linear combination of phase-shifted versions of the first and the second sensor pixel image data. For example, $$\underline{Z_a} = \frac{1}{\det\left(\begin{bmatrix} e^{j\Delta\varphi_{a1}} & e^{j\Delta\varphi_{b1}} \\ e^{j\Delta\varphi_{a2}} & e^{j\Delta\varphi_{b2}} \end{bmatrix}\right)} (e^{j\Delta\varphi_{b2}} \cdot \underline{Z_{meas1}} - e^{j\Delta\varphi_{b1}} \cdot \underline{Z_{meas2}})$$

Furthermore, the image processing circuit 103 may be configured to determine the second sub-image data $\underline{Z_b}$ based on at least a second linear combination of phase-shifted versions of the first and the second sensor pixel image data. For example, $$\underline{Z_b} = \frac{1}{\det\left(\begin{bmatrix} e^{j\Delta\varphi_{a1}} & e^{j\Delta\varphi_{b1}} \\ e^{j\Delta\varphi_{a2}} & e^{j\Delta\varphi_{b2}} \end{bmatrix}\right)} (-e^{j\Delta\varphi_{a2}} \cdot \underline{Z_{meas1}} + e^{j\Delta\varphi_{a1}} \cdot \underline{Z_{meas2}}).$$

More details and aspects are mentioned in connection with embodiments described above or below (e.g. regarding the imaging apparatus, the light emitters, the image sensor circuit, the TOF sensor pixels, the sensor pixel image data, the image processing circuit, and the set of time of flight values). The embodiment shown in FIGS. 2A to 2D may comprise one or more optional additional features corresponding to one or more aspects mentioned in connection with the proposed concept or one or more embodiments described above (e.g. FIG. 1) or below (e.g. FIGS. 3 to 5).

Figure 3:
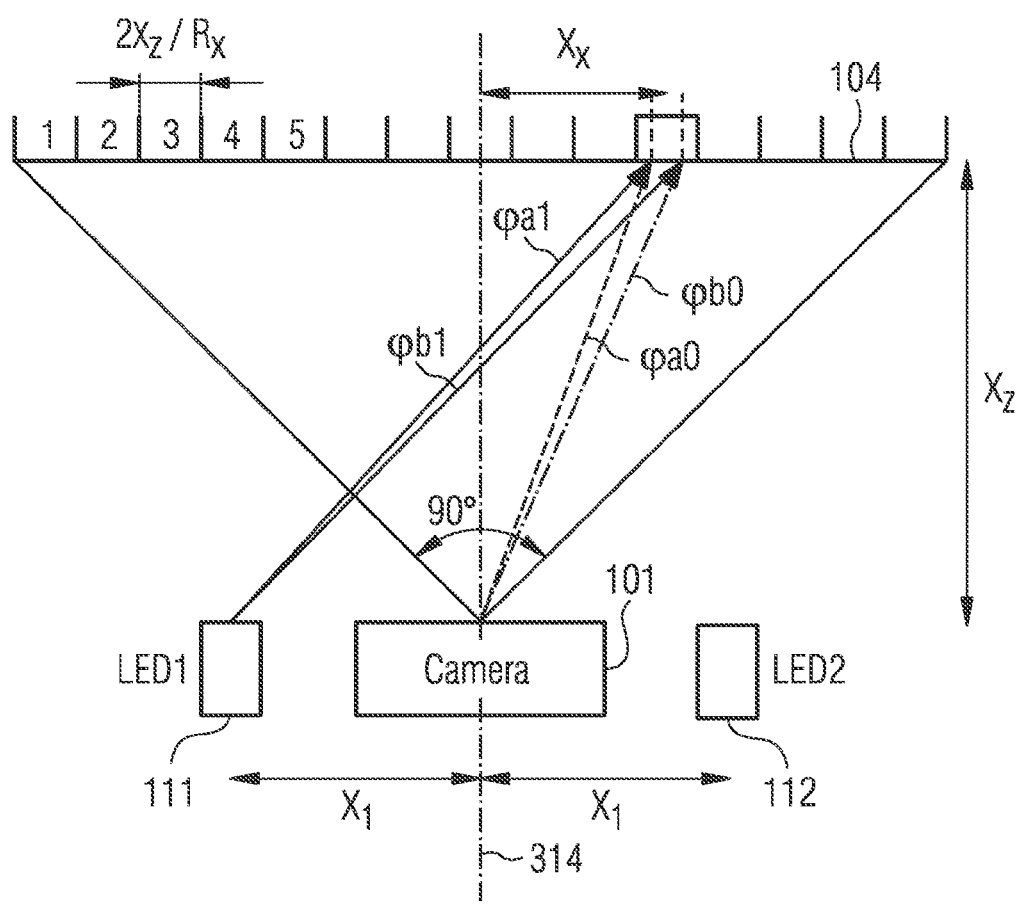
FIG. 3 shows a schematic illustration of an imaging apparatus.

FIG. 3 shows an example of the imaging apparatus (e.g. imaging apparatus 200) and geometrical values used by the image processing circuit for producing an improved 3D image, according to an embodiment.

The image processing circuit 103 may be configured to determine the time-of flight offsets. For example, the image processing circuit may be configured to carry out a factor correction process to derive the time of flight offset values by multiplying each offset by a factor $2\pi f/c$, for example. For example, the set of time of flight offset values may be derived by the image processing circuit 103 based on the following equations:

$$\Delta\varphi_{a1} = \varphi_{a1} - \varphi_{a0} = \sqrt{\left(x_x + x_1 - \frac{x_z}{2R_x}\right)^2 + x_z^2} - \varphi_{a0};$$

$$\Delta\varphi_{b1} = \varphi_{b1} - \varphi_{b0} = \sqrt{\left(x_x + x_1 - \frac{x_z}{2R_x}\right)^2 + x_z^2} - \varphi_{b0};$$

$$\Delta\varphi_{a2} = \varphi_{a2} - \varphi_{a0} = \sqrt{\left(x_x + x_1 - \frac{x_z}{2R_x}\right)^2 + x_z^2} - \varphi_{a0};$$

and $$\Delta\varphi_{b2} = \varphi_{b2} - \varphi_{b0} = \sqrt{\left(x_x + x_1 + \frac{x_z}{2R_x}\right)^2 + x_z^2} - \varphi_{b0}.$$

The first time of flight offset $\Delta\varphi_{a1}$ may denote an offset (e.g. a phase offset or phase difference) between a reference time of flight $\varphi_{a0}$ of received light emitted by a reference light emitter and reflected at the object's first sub-region (e.g. region A) and a time of flight of received light $\varphi_{a1}$ emitted by the first light emitter 111 and reflected at the object's first sub-region. The first time of flight offset $\Delta\varphi_{a1}$ may be based on the first spatial offset, for example.

The second time of flight offset $\Delta\varphi_{b1}$ may denote an offset (e.g. a phase offset or phase difference) between a reference time of flight $\varphi_{b0}$ of received light emitted by the reference light emitter and reflected at the object's second sub-region (e.g. region B) and a time of flight of received light $\varphi_{b1}$ emitted by the first light emitter 111 and reflected at the object's second sub-region. The second time of flight offset $\Delta\varphi_{b1}$ may be based on the first spatial offset, for example.

The third time of flight offset $\Delta\varphi_{a2}$ may denote an offset (e.g. a phase offset or phase difference) between the reference time of flight $\varphi_{a0}$ of received light emitted by the reference light emitter and reflected at the object's first sub-region (e.g. region A) and a time of flight of received light $\varphi_{a2}$ emitted by the second light emitter 112 and reflected at the object's first sub-region. The third time of flight offset $\Delta\varphi_{a2}$ may be based on the second spatial offset, for example.

The fourth time of flight offset $\Delta\varphi_{b2}$ may denote an offset (e.g. a phase offset or phase difference) between the reference time of flight $\varphi_{b0}$ of received light emitted by the reference light emitter and reflected at the object's second sub-region (e.g. region B) and a time of flight of received light $\varphi_{b2}$ emitted by the second light emitter 112 and reflected at the object's second sub-region. The fourth time of flight offset $\Delta\varphi_{b2}$ may be based on the second spatial offset, for example.

$\Delta\varphi_{a1}$ and $\Delta\varphi_{b1}$ may be the time of flight offsets related to the first light emitter (e.g. LED 1) and $\Delta\varphi_{a2}$ and $\Delta\varphi_{b2}$ may be the time of flight offsets related to the second light emitter (e.g. LED 2).

The reference time of flight values may be obtained, for example by carrying out a reference TOF measurement. For example, all light emitters may emit light simultaneously. For example, the light emitter control circuit may be configured to trigger the first and second light emitter to simultaneously emit light. The light reflected by the object may be received by the TOF sensor pixel, and reference sensor pixel image data including amplitude and phase information about the received light, may be generated by the TOF sensor pixel. For each TOF sensor pixel, the first reference sub-image data $\varphi_{a0}$ and second reference sub-image data $\varphi_{b0}$ may be determined based on the reference sensor pixel image data generated by the image processing circuit 103 based on the reference cross-correlation measurement, for example. In an example, the reference TOF measurement may be carried out before the sequential emission of each individual light emitter at the different positions with respect to the image sensor circuit, for example. In an example, the reference TOF measurement may be based on the emission of light from only one light emitter, or any combination of light emitters for example.

The first reference sub-image data $\varphi_{a0}$ and the second reference sub-image data $\varphi_{b0}$ may each be generated or determined based on a first and second sub-image position offset, respectively. In an example, the imaging apparatus 200 may include a collector optic having a known angle range (e.g. a 90° angle range) for collecting or receiving light reflected by the object. The first reference sub-image data $\varphi_{a0}$ may be determined based on a time of flight sensor pixel position offset, a first sub-image position offset, and a distance between a region of the object and the TOF sensor pixel array, for example. The second reference sub-image data $\varphi_{b0}$ may be determined based on the time of flight sensor pixel position offset, a second sub-image position offset, and a distance between a region of the object and the TOF sensor pixel array, for example.

In the example, the first reference sub-image data $\varphi_{a0}$ and the second reference sub-image data $\varphi_{b0}$ may each be denoted by $$\varphi_{a0} = \sqrt{\left(x_x - \frac{x_z}{2R_x}\right)^2 + x_z^2} \text{ ; and}$$

$$\varphi_{b0} = \sqrt{\left(x_x + \frac{x_z}{2R_x}\right)^2 + x_z^2}$$

where $x_x$ represents the time of flight sensor pixel position offset, $$\frac{x_z}{2R_x}$$

represents a SLID-image position offset, and $x_z$ represents a distance between a region of the object and the TOF sensor pixel array.

In an example, $x_x$ may be a time of flight sensor pixel position offset, which may be determined based on the geometry of the imaging apparatus and a position of the TOF sensor pixel in the TOF sensor pixel array, for example.

$x_z$ may be a perpendicular distance between a region of the object and a planar surface of the TOF sensor pixel array, or a shortest distance between a region of the object and a virtual plane coplanar with the planar surface of the TOF sensor pixel array. The value $x_z$ may be derived from the reference measurement, for example.

$$\frac{x_z}{2R_x}$$

may be an absolute value of a first or second sub-image position offset, based on a pixel size of an image of a region of the object being based $$\frac{2x_z}{R_x}$$

on the geometry of the imaging apparatus and receiving angle of the collector optic. For example, the first (reference) sub-image data may have a negative spatial offset with respect to a line of reference in the TOF sensor pixel and the second (reference) sub-image data may have a positive spatial offset with respect to the line of reference. The line of reference may be an axis of symmetry (e.g. a vertical or horizontal axis of symmetry) of the TOF sensor pixel, for example.

$x_1$ may be an absolute value of a spatial offset of the first and second light emitter. For example, the first spatial offset may be a negative spatial offset with respect to a line of reference 314 (or e.g. an axis of symmetry) of the image sensor circuit 103 or the imaging apparatus 100 and the second spatial offset may be a positive spatial offset with respect to the line of reference (or e.g. an axis of symmetry).

The first time of flight offset $\Delta\varphi_{a1}$ may be associated with the first light emitter and the first sub-region. The second time of flight offset $\Delta\varphi_{b1}$ may be associated with the first light emitter and the second sub-region. The third time of flight offset $\Delta\varphi_{a2}$ may be associated with the second light emitter and the first sub-region. The fourth time of flight offset $\Delta\varphi_{b2}$ may be associated with the second light emitter and the second sub-region.

The first to fourth time of flight offsets (e.g. $\Delta\varphi_{a1}$, $\Delta\varphi_{b1}$, $\Delta\varphi_{a2}$ and $\Delta\varphi_{b2}$) may each be derived based on a phase offset between a reference time of flight of received light emitted by a reference light emitter and reflected at a sub-region of the object and a time of flight of received light emitted respectively by the first to fourth light emitters and reflected at the sub-region of the object.

The set of time of flight offset values derived by the image processing circuit 103 may be further based on a factor related to the speed of light c and the modulation frequency f. For example, the image processing circuit may be configured to carry out a factor correction process to derive the time of flight offset values by multiplying each offset by a factor $$\frac{2\pi f}{c},$$

for example.

As an example, for $x_z=1$ m, $R_x=100$, Pixel 73 ($x_x=23$ cm), $x_1=10$ cm $$\varphi_{delay} = \begin{bmatrix} \Delta\varphi_{a1} & \Delta\varphi_{b1} \\ \Delta\varphi_{a2} & \Delta\varphi_{b2} \end{bmatrix} = \begin{bmatrix} -1.72 \text{ cm} & -1.82 \text{ cm} \\ 2.65 \text{ cm} & 2.74 \text{ cm} \end{bmatrix}$$

The first sub-image data (e.g. $\underline{Z_a}$) and the second sub-image data (e.g. $\underline{Z_b}$) for one TOF sensor pixel may be determined based on a linear combination of the time of flight offset values and the measured first and second sensor pixel image data by that TOF sensor pixel, for example. Analogously, the image processing circuit may be configured to determine first sub-image data and second sub-image data for every TOF sensor pixel of the plurality of TOF sensor pixels, for example.

Although the above example relates to an imaging apparatus having only two light emitters, it may be understood that in other examples, more than two light emitters may be used. In an analogous example, four light emitters may be used to obtain four sub-image data of four sub-regions (A, B, C, and D).

For example, a measurement of the sensor pixel image data may be (or include) the superposition of sub-pixels of sub-image data (e.g. four sub-pixels).

$$\underline{Z_{meas}} = |Z_a| \cdot e^{j\varphi_a} + |Z_b| \cdot e^{j\varphi_b} + |Z_c| \cdot e^{j\varphi_c} + |Z_d| \cdot e^{j\varphi_d}$$

Depending on the activated light emitter (e.g. LED), the distance is different.

$$\underline{Z_{meas1}} = |Z_a| \cdot e^{j(\varphi_a+\Delta\varphi_{a1})} + |Z_b| \cdot e^{j(\varphi_b+\Delta\varphi_{b1})} |Z_c| \cdot e^{j(\varphi_c+\Delta\varphi_{c1})} + |Z_d| \cdot e^{j(\varphi_d+\Delta\varphi_{d1})}$$

For example, four measurements with subsequently (or sequentially) activated light emitters (e.g. LEDs) may be carried out.

$\underline{Z}_{meas1} = |Z_a| \cdot e^{j\varphi_a} \cdot e^{j\Delta\varphi_{a1}} + |Z_b| \cdot e^{j\varphi_b} \cdot e^{j\Delta\varphi_{b1}} + |Z_c| \cdot e^{j\varphi_c} \cdot e^{j\Delta\varphi_{c1}} + |Z_d| \cdot e^{j\varphi_d} \cdot e^{j\Delta\varphi_{d1}}$ $\underline{Z}_{meas2} = |Z_a| \cdot e^{j\varphi_a} \cdot e^{j\Delta\varphi_{a2}} + |Z_b| \cdot e^{j\varphi_b} \cdot e^{j\Delta\varphi_{b2}} + |Z_c| \cdot e^{j\varphi_c} \cdot e^{j\Delta\varphi_{c2}} + |Z_d| \cdot e^{j\varphi_d} \cdot e^{j\Delta\varphi_{d2}}$ $\underline{Z}_{meas3} = |Z_a| \cdot e^{j\varphi_a} \cdot e^{j\Delta\varphi_{a3}} + |Z_b| \cdot e^{j\varphi_b} \cdot e^{j\Delta\varphi_{b3}} + |Z_c| \cdot e^{j\varphi_c} \cdot e^{j\Delta\varphi_{c3}} + |Z_d| \cdot e^{j\varphi_d} \cdot e^{j\Delta\varphi_{d3}}$ $\underline{Z}_{meas4} = |Z_a| \cdot e^{j\varphi_a} \cdot e^{j\Delta\varphi_{a4}} + |Z_b| \cdot e^{j\varphi_b} \cdot e^{j\Delta\varphi_{b4}} + |Z_c| \cdot e^{j\varphi_c} \cdot e^{j\Delta\varphi_{c4}} + |Z_d| \cdot e^{j\varphi_d} \cdot e^{j\Delta\varphi_{d4}}$ Simplified, this means:

$\underline{Z}_{meas1} = \underline{Z}_a \cdot e^{j\Delta\varphi_{a1}} + \underline{Z}_b \cdot e^{j\Delta\varphi_{b1}} + \underline{Z}_c \cdot e^{j\Delta\varphi_{c1}} + \underline{Z}_d \cdot e^{j\Delta\varphi_{d1}}$ $\underline{Z}_{meas2} = \underline{Z}_a \cdot e^{j\Delta\varphi_{a2}} + \underline{Z}_b \cdot e^{j\Delta\varphi_{b2}} + \underline{Z}_c \cdot e^{j\Delta\varphi_{c2}} + \underline{Z}_d \cdot e^{j\Delta\varphi_{d2}}$ $\underline{Z}_{meas3} = \underline{Z}_a \cdot e^{j\Delta\varphi_{a3}} + \underline{Z}_b \cdot e^{j\Delta\varphi_{b3}} + \underline{Z}_c \cdot e^{j\Delta\varphi_{c3}} + \underline{Z}_d \cdot e^{j\Delta\varphi_{d3}}$ $\underline{Z}_{meas4} = \underline{Z}_a \cdot e^{j\Delta\varphi_{a4}} + \underline{Z}_b \cdot e^{j\Delta\varphi_{b4}} + \underline{Z}_c \cdot e^{j\Delta\varphi_{c4}} + \underline{Z}_d \cdot e^{j\Delta\varphi_{d4}}$ Vectors may be introduced, and $\underline{Z}_m$ may represent measured sensor pixel image data, e.g. first to fourth sensor pixel image data represented by $\underline{Z}_{meas1}$, $\underline{Z}_{meas2}$, $\underline{Z}_{meas3}$ and $\underline{Z}_{meas4}$ respectively.

$$\underline{Z}_m = \begin{bmatrix} \underline{Z}_{meas1} \\ \underline{Z}_{meas1} \\ \underline{Z}_{meas3} \\ \underline{Z}_{meas4} \end{bmatrix}$$

Each of the sub-image data to be determined may be represented by the vector $\underline{Z}_{wanted}$, which may represent first to fourth sub-image (or sub-pixel) data, for example.

$$\underline{Z}_{wanted} = \begin{bmatrix} \underline{Z}_a \\ \underline{Z}_b \\ \underline{Z}_c \\ \underline{Z}_d \end{bmatrix}$$

A set of time of flight values may be determined by the image processing circuit 103, for example. The set of time of flight values $\varphi_{delay}$ may include a plurality of time of flight values, e.g. $2^m$ number of delay values e.g. 16 delay values, for example.

$$\varphi_{delay} = \begin{bmatrix} e^{j\Delta\varphi_{a1}} & e^{j\Delta\varphi_{b1}} & e^{j\Delta\varphi_{c1}} & e^{j\Delta\varphi_{d1}} \\ e^{j\Delta\varphi_{a2}} & e^{j\Delta\varphi_{b2}} & e^{j\Delta\varphi_{c2}} & e^{j\Delta\varphi_{d2}} \\ e^{j\Delta\varphi_{a3}} & e^{j\Delta\varphi_{b3}} & e^{j\Delta\varphi_{c3}} & e^{j\Delta\varphi_{d3}} \\ e^{j\Delta\varphi_{a4}} & e^{j\Delta\varphi_{b4}} & e^{j\Delta\varphi_{c4}} & e^{j\Delta\varphi_{d4}} \end{bmatrix}$$

$\underline{Z}_m = \varphi_{delay} \cdot \underline{Z}_{wanted}$ and $\underline{Z}_{wanted} = \varphi_{delay}^{-1} \cdot \underline{Z}_m$.

The image processing circuit 103 may be configured to produce the different sub-image data (e.g. $\underline{Z}_a$, $\underline{Z}_b$, $\underline{Z}_c$ and $\underline{Z}_d$) based on a linear combination of phase-shifted versions of the first, second, third and fourth sensor pixel image data.

It may be understood that while an approximation for deriving the set of time of flight values has been presented, other calculation methods may be used to determine or derive the set of time of flight values.

More details and aspects are mentioned in connection with embodiments described above or below (e.g. regarding the imaging apparatus, the light emitters, the image sensor circuit, the TOF sensor pixels, the sensor pixel image data, the image processing circuit, and the set of time of flight values). The embodiment shown in FIG. 3 may comprise one or more optional additional features corresponding to one or more aspects mentioned in connection with the proposed concept or one or more embodiments described above (e.g. FIGS. 1 to 2D) or below (e.g. FIGS. 4 to 5).

FIG. 4 shows a schematic illustration of an imaging apparatus 400 according to an embodiment.

The imaging apparatus 400 may be similar to the imaging apparatus described with respect to FIGS. 1 to 3, for example.

Additionally or alternatively, the image processing circuit 403 may be configured to produce a reduced-error image of the object based on a comparison of phase information of the first sensor pixel image data and the second sensor pixel image data. For example, for a TOF system, it may be very challenging to measure corners 415 of an object 404. The image processing circuit 403 may be configured to produce the image of the object's region based on a selection of one of the first sensor pixel image data and the second sensor pixel image data having a minimum phase value, for example. In this way, the light emitters having different spatial offsets may be used to compare multipath propagation caused by the different positions of the light emitters. Images which suffer from high multipath propagation may be eliminated, or reduced, and a produced 3D image may be based on image data with minimal or reduced multipath propagation, for example. As pixel image data having a minimum phase value may be indicative of a minimal amount of multipath propagation in a TOF system, the sensor pixel image data having the minimum (or smallest) measured phase value may be selected. In this way, multipath propagation in a TOF system may be reduced or eliminated, for example.

More details and aspects are mentioned in connection with embodiments described above or below (e.g. regarding the imaging apparatus, the light emitters, the image sensor circuit, the TOF sensor pixels, the sensor pixel image data, the image processing circuit, and the set of time of flight values). The embodiment shown in FIG. 4 may comprise one or more optional additional features corresponding to one or more aspects mentioned in connection with the proposed concept or one or more embodiments described above (e.g. FIGS. 1 to 3) or below (e.g. FIG. 5).

FIG. 5 shows a flow chart of a time of flight imaging method 500 according to an embodiment.

The method 500 includes receiving 510, by a time of flight sensor pixel, light emitted by a first light emitter having a first spatial offset relative to the time of flight sensor pixel and reflected by a region of an object to generate first sensor pixel image data.

The method 500 further includes receiving 520, by the time of flight sensor pixel, light emitted by a second light emitter having a second spatial offset relative to the time of flight sensor pixel and reflected by the region of the object to generate second sensor pixel image data.

The method 500 further includes producing 530 an image of the object's region based on the first and second sensor pixel image data generated by the time of flight sensor pixel.

Producing the image may include determining a first sub-image data of a first sub-region of the object's region and second sub-image data of a (different) second sub-region of the object's region. For example, the number of sub-regions may correspond to a number of light emitters having different spatial offsets, and the first and the second image sub-image data may be determined based on the first and the second sensor pixel image data.

The method may further include determining the first sub-image based on a first linear combination of phase-shifted versions of the first and the second sensor pixel image data. The method may further include determining the second sub-image based on a second linear combination of phase-shifted versions of the first and the second sensor pixel image data.

The phase-shifted versions of the first and the second sensor pixel image data may be obtained based on a combination of the first and the second sensor pixel image data with a set of time of flight offsets. For example, a first time of flight offset may be associated with the first light emitter and the first sub-region. A second time of flight offset may be associated with the first light emitter and the second sub-region. A third time of flight offset of the set may be associated with the second light emitter and the first sub-region. A fourth time of flight offset may be associated with the second light emitter and the second sub-region.

The method may further include determining a first reference sub-image and a second reference sub-image based on a reference TOF measurement. The reference TOF measurement may be carried out by receiving light emitted by at least one light emitter and reflected by the object.

More details and aspects are mentioned in connection with embodiments described above or below (e.g. regarding the imaging apparatus, the light emitters, the image sensor circuit, the TOF sensor pixels, the sensor pixel image data, the image processing circuit, and the set of time of flight values). The embodiment shown in FIG. 5 may comprise one or more optional additional features corresponding to one or more aspects mentioned in connection with the proposed concept or one or more embodiments described above (e.g. FIGS. 1 to 4) or below (e.g. FIG. 6).

FIG. 6 shows a flow chart of a time of flight imaging method 600 according to an embodiment.

The method 600 includes receiving 610, by a time of flight sensor pixel, light emitted by a first light emitter having a first spatial offset relative to the time of flight sensor pixel and reflected by a region of an object to generate first sensor pixel image data.

The method 600 further includes receiving 620, by the time of flight sensor pixel, light emitted by a second light emitter having a second spatial offset relative to the time of flight sensor pixel and reflected by the region of the object to generate second sensor pixel image data.

The method 600 further includes producing an image of the region of the object based on a selection of one of the first and second sensor pixel image data.

The selection may be based on a comparison of phase information of the first and second sensor pixel image data, for example.

Various embodiments relate to increasing the resolution of a time of flight (TOF) system. Various embodiments may include sensor shifting principles, stereoscopy principles and Radar principles with multiple transmit and receive antennas, for example.

Example embodiments may further provide a computer program having a program code for performing one of the above methods, when the computer program is executed on a computer or processor. A person of skill in the art would readily recognize that acts of various above-described methods may be performed by programmed computers. Herein, some example embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The invention claimed is:

1. An imaging apparatus, comprising:
an image sensor circuit comprising a time of flight sensor pixel;
a first light emitter having a first spatial offset relative to the time of flight sensor pixel;
a second light emitter having a second spatial offset relative to the time of flight sensor pixel; and
an image processing circuit configured to produce an image of a region of an object based on first sensor pixel image data and second sensor pixel image data generated by the time of flight sensor pixel,
wherein the first sensor pixel image data is based on received light emitted by the first light emitter and reflected at the region of the object and wherein the second sensor pixel image data is based on received light emitted by the second light emitter and reflected at the region of the object,
wherein the image processing circuit is configured to determine first sub-image data of a first sub-region of the region of the object and second sub-image data of a second sub-region of the region of the object, and
wherein the image processing circuit is configured to determine the first sub-image data based on a first linear combination of phase-shifted versions of the first sensor pixel image data and the second sensor pixel image data and to determine the second sub-image data based on a second linear combination of phase-shifted versions of the first sensor pixel image data and the second sensor pixel image data.

2. The imaging apparatus of claim 1, wherein the first light emitter and the second light emitter are arranged at different equidistant positions relative to the image sensor circuit.

3. The imaging apparatus of claim 1, wherein the first light emitter and the second light emitter are arranged symmetrically with respect to at least one axis of symmetry of the image sensor circuit.

4. The imaging apparatus of claim 1, wherein the first light emitter is configured to emit light during a first time interval and the second light emitter is configured to emit light during a second time interval.

5. The imaging apparatus of claim 1, wherein the first light emitter and the second light emitter are configured to simultaneously emit differently polarized light.

6. The imaging apparatus of claim 1, wherein the time of flight sensor pixel comprises a photonic mixing device configured to generate the first sensor pixel image data and the second sensor pixel image data based on a respective cross-correlation measurement based on received modulated light and a reference modulation signal.

7. The imaging apparatus of claim 1, wherein the first light emitter and the second light emitter respectively comprise a light emitting portion of a light transmitter.

8. The imaging apparatus of claim 1, wherein the first light emitter and the second light emitter respectively comprises one or more light emitting diodes or lasers.

9. The imaging apparatus of claim 1, wherein a number of sub-regions corresponds to a number of light emitters having different spatial offsets.

10. The imaging apparatus of claim 1, wherein the image processing circuit is configured to produce the first sub-image data and the second sub-image data based on a linear combination of phase-shifted versions of the first sensor pixel image data and the second sensor pixel image data.

11. The imaging apparatus of claim 1, wherein the image processing circuit is configured to obtain the phase-shifted versions of the first sensor pixel image data and the second sensor pixel image data based on a combination of the first sensor pixel image data and the second sensor pixel image data with a set of time of flight offsets, wherein a first time of flight offset, of the set of time of flight offsets, is associated with the first light emitter and the first sub-region, a second time of flight offset, of the set of time of flight offsets, is associated with the first light emitter and the second sub-region, a third time of flight offset, of the set of time of flight offsets, is associated with the second light emitter and the first sub-region, and a fourth time of flight offset, of the set of time of flight offsets, is associated with the second light emitter and the second sub-region.

12. The imaging apparatus of claim 11, wherein
the first time of flight offset denotes an offset between a reference time of flight of received light emitted by a reference light emitter and reflected at the first sub-region and a time of flight of received light emitted by the first light emitter and reflected at the first sub-region,
the second time of flight offset denotes an offset between a reference time of flight of received light emitted by the reference light emitter and reflected at the second sub-region and a time of flight of received light emitted by the first light emitter and reflected at the second sub-region,
the third time of flight offset denotes an offset between the reference time of flight of received light emitted by the reference light emitter and reflected at the first sub-region and a time of flight of received light emitted by the second light emitter and reflected at the first sub-region, and
the fourth time of flight offset denotes an offset between the reference time of flight of received light emitted by the reference light emitter and reflected at the second sub-region and a time of flight of received light emitted by the second light emitter and reflected at the second sub-region.

13. The imaging apparatus of claim 11, wherein the image processing circuit is configured to determine the first sub-image data and the second sub-image data corresponding to $$\begin{pmatrix} Z_a \\ Z_b \end{pmatrix} = \varphi_{delay}^{-1} \cdot \begin{pmatrix} Z_{meas1} \\ Z_{meas2} \end{pmatrix},$$

wherein $$\varphi_{delay} = \begin{pmatrix} e^{j\Delta\varphi_{a1}} & e^{j\Delta\varphi_{b1}} \\ e^{j\Delta\varphi_{a2}} & e^{j\Delta\varphi_{b2}} \end{pmatrix},$$

wherein $Z_a$ and $Z_b$ comprise intensity and phase information related to the first sub-image data and the second sub-image data respectively, wherein $\underline{Z_{meas1}}$ and $\underline{Z_{meas2}}$ comprise intensity and phase information related to the first sensor pixel image data and the second sensor pixel image data respectively, and wherein $e^{j\Delta\varphi_{a1}}$, $e^{j\Delta\varphi_{b1}}$, $e^{j\Delta\varphi_{a2}}$, and $e^{j\Delta\varphi_{b1}}$ are indicative of the first time of flight offset, the second time of flight offset, the third time of flight offset, and the fourth time of flight offset, respectively.

14. The imaging apparatus of claim 1, wherein the image processing circuit is configured to produce the image of the region of the object based on a comparison of phase information of the first sensor pixel image data and the second sensor pixel image data.

15. The imaging apparatus of claim 14, wherein the image processing circuit is configured to produce the image of the region of the object based on a selection of one of the first sensor pixel image data or the second sensor pixel image data having a smallest phase value.

16. A time of flight imaging method, the method comprising:
receiving, by a time of flight sensor pixel, light emitted by a first light emitter having a first spatial offset relative to the time of flight sensor pixel and reflected by a region of an object to generate first sensor pixel image data;
receiving, by the time of flight sensor pixel, light emitted by a second light emitter having a second spatial offset relative to the time of flight sensor pixel and reflected by the region of the object to generate second sensor pixel image data; and
producing an image of the region of the object based on the first sensor pixel image data and the second sensor pixel image data generated by the time of flight sensor pixel,
wherein producing the image is based on determining a first sub-image data of a first sub-region of the region of the object and second sub-image data of a second sub-region of the region of the object, and
wherein determining the first sub-image data is based on a first linear combination of phase-shifted versions of the first sensor pixel image data and the second sensor pixel image data; and
wherein determining the second sub-image data is based on a second linear combination of phase-shifted versions of the first sensor pixel image data and the second sensor pixel image data.

17. The method of claim 16,
wherein a number of sub-regions corresponds to a number of light emitters having different spatial offsets, wherein the first sub-image data and the second sub-image data are determined based on the first sensor pixel image data and the second sensor pixel image data.

18. The method of claim 17,
wherein the phase-shifted versions of the first sensor pixel image data and the second sensor pixel image data are obtained based on a combination of the first sensor pixel image data and the second sensor pixel image data with a set of time of flight offsets, wherein a first time of flight offset, of the set of time of flight offsets, is associated with the first light emitter and the first sub-region, a second time of flight offset, of the set of time of flight offsets, is associated with the first light emitter and the second sub-region, a third time of flight offset, of the set of time of flight offsets, is associated with the second light emitter and the first sub-region, and a fourth time of flight offset, of the set of time of flight offsets, is associated with the second light emitter and the second sub-region.

19. An imaging apparatus, comprising:
an image sensor circuit comprising a plurality of time of flight sensor pixels;
a first light emitter having a first spatial offset relative to the image sensor circuit;
a second light emitter having a second spatial offset relative to the image sensor circuit; and
an image processing circuit configured to produce an image of a region of an object based on first sensor pixel image data and second sensor pixel image data generated by a time of flight sensor pixel of the plurality of time of flight sensor pixels, wherein the image comprises first sub-image data of a first sub-region of the object and second sub-image data about a second sub-region of the object,
wherein the first sensor pixel image data is based on received light emitted by the first light emitter and reflected by the object and wherein the second sensor pixel image data is based on received light emitted by the second light emitter and reflected by the object,
wherein the image processing circuit is configured to obtain phase-shifted versions of the first sensor pixel image data and the second sensor pixel image data based on a combination of the first sensor pixel image data and the second sensor pixel image data with a set of time of flight offsets, and
wherein a first time of flight offset, of the set of time of flight offsets, is associated with the first light emitter and the first sub-region, a second time of flight offset, of the set of time of flight offsets, is associated with the first light emitter and the second sub-region, a third time of flight offset, of the set of time of flight offsets, is associated with the second light emitter and the first sub-region, and a fourth time of flight offset, of the set of time of flight offsets, is associated with the second light emitter and the second sub-region.

20. The imaging apparatus of claim 19, wherein the plurality of time of flight sensor pixels include a planar surface, and
wherein the first light emitter and the second light emitter are arranged coplanar to the planar surface of the plurality of time of flight sensor pixels.

* * * * *